Nov. 12, 1957 G. L. BOLEY 2,812,678
TOOL BLOCK HOLDER
Filed May 10, 1957
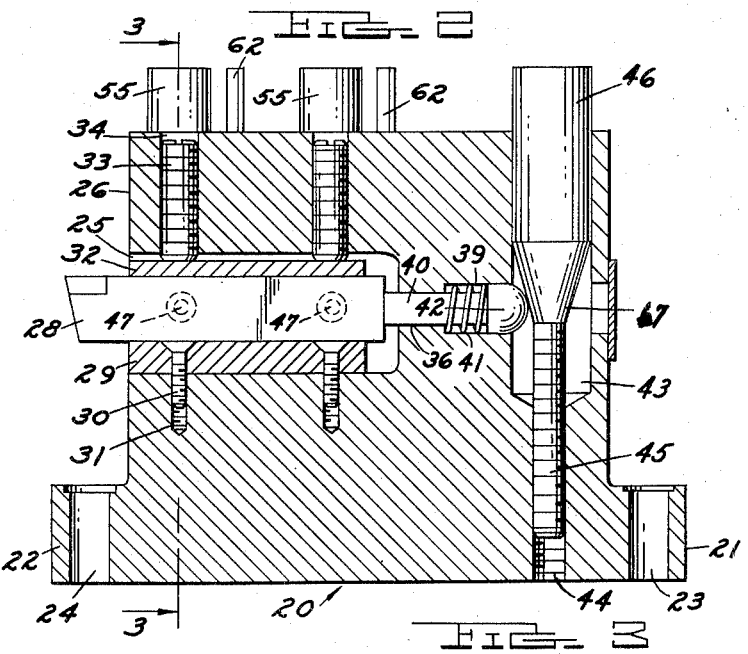
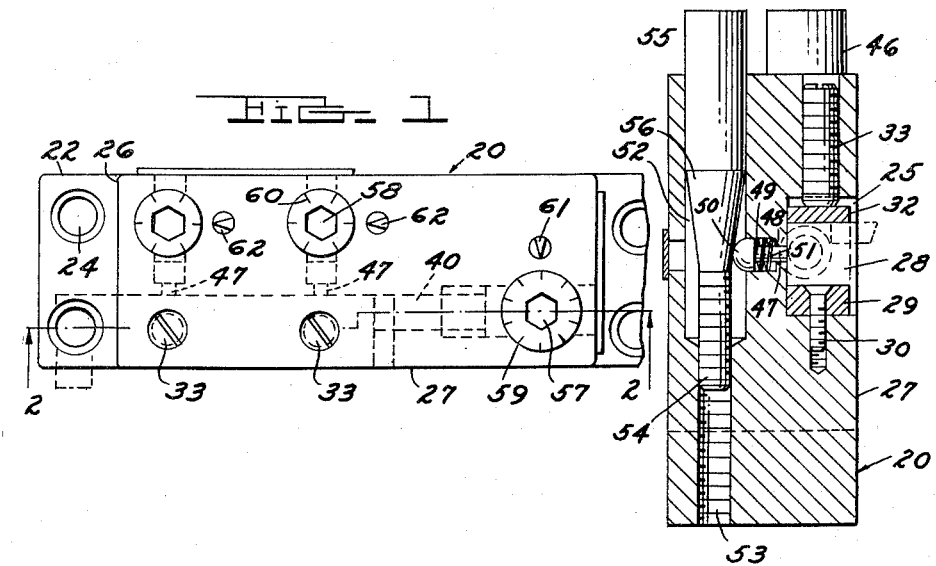
INVENTOR.
GEORGE L. BOLEY
BY
ATTORNEY

United States Patent Office 2,812,678
Patented Nov. 12, 1957

2,812,678

TOOL BLOCK HOLDER

George L. Boley, Birmingham, Mich.

Application May 10, 1957, Serial No. 658,299

7 Claims. (Cl. 82—36)

This invention relates to tool holders and particularly pertains to a tool block having adjustable means for moving the tools sidewise and endwise of the block and for indicating the distance the tool is moved relative to the block.

Adjustable tool holders and blocks have been employed heretofore to move a tool relative to a workpiece, however, the several devices of the prior art have not proven entirely satisfactory inasmuch as they are complicated in design and construction, expensive to manufacture, inaccurate in use, and difficult to adjust and maintain.

With the foregoing in view, the primary object of the invention is to provide a tool holding block which is simple in design and construction, inexpensive to manufacture, easy to use, easy to maintain, and which gives an accurate indication of the amount the tool is moved relative to the block or a workpiece in both an endwise and/or sidewise direction.

An object of the invention is to provide a tool block having a tool receiving cavity and releasable securing means for securely holding the tool in the cavity during use periods and for permitting forced movement of the tool relative to the cavity and the workpiece during periods of adjustment.

An object of the invention is to provide a tool holding block having at least one transverse end and side apertures communicating with the tool receiving cavity.

An object of the invention is to provide plungers in the block apertures having an end for contacting a tool and a head for contacting a shaft cam.

An object of the invention is to provide shafts having frusto-conical or tapered cam portions contacting the plunger heads for the purpose of forcing the plungers into the block cavity for moving a tool endwise and/or sidewise relative to a workpiece.

An object of the invention is to provide a co-ordinated threaded stem, cam portion, and cam markings on the shafts relative to an index so that in rotating the shaft an indication is given of the amount or distance the tool has been moved in an endwise or sidewise direction.

These and other objects of the invention will become apparent by reference to the following description of a tool block having tool holding and moving means embodying the invention taken in connection with the accompanying drawing in which:

Fig. 1 is a top plan view of the device showing the shafts, gage markings, and indices.

Fig. 2 is a cross-sectional view of Fig. 1 taken on the line 2—2 thereof showing the tool securing means and the means for endwise moving a tool; and Fig. 3 is a cross-sectional view of Fig. 2 taken on the line 3—3 thereof showing the tool holding means and the means for sidewise moving a tool.

Referring now to the drawing wherein like numerals refer to like and corresponding parts throughout the several views, the tool holder disclosed therein to illustrate the invention, comprises a block having a tool receiving cavity for receiving a tool, means for securing a tool relative to the block, plunger means for moving the tool relative to the block, and shafts having cams thereon for moving the plunger means and tool a known distance or amount which is indicated by gage markings on the shafts relative to indexes on the block.

More particularly, the block 20 is equipped with flange portions 21 and 22 having bolt holes 23 and 24 for securing the block on a machine; the tool receiving cavity 25 opens through the endwall 26 of the block and also through the sidewall 27 of the block so that the tool 28 can be moved sidewise and endwise outwardly of the block if necessary also so that the tool 28 can be inserted in the block from either an endwise or sidewise direction. The spacer-filler pad 29 is positioned in the bottom of the cavity 25 and is secured by the screws 30 threaded in the block apertures 31 and the spacer-filler plate 32 is positioned over the tool 28 and below the set screws 33 which are threaded in the block apertures 34; it can now be seen that the screws 33 fix the tool 28 relative to the block when tightened by urging the plate 32 against the tool 28 which is supported by the pad 29; different thickness pads 29 and plates 32 can be used with different size tools to fix a tool 28 relative to the block 20 and to prevent the set screws 33 from projecting too far into the cavity to eliminate bending.

The block 20 is also provided with a transverse end aperture 36 which is counter-bored as at 39 for receiving the spring 41 and plunger head 42 therein; the block chamber 43 is disposed normal to the aperture 36 and communicates sidewise therewith and is adapted to receive, at least partially, the plunger head 42 therein, and the chamber 43 terminates in a threaded bore 44 which receives the threaded stem 45 of the shaft 46 with the frusto-conical intermediate cam portion 67 of the shaft 46 contacting the plunger head 42.

The block 20 is also provided with one or more transverse side apertures 47 which receive the side plungers 48 and these apertures are counterbored as at 49 to receive the plunger head 50 and spring 51; the block is also provided with one or more transverse chambers 52 which terminate in a threaded bore 53 for receiving the threaded stem 54 of the side shafts 55 which are equipped with frusto-conical intermediate cam portions 56 for contacting the side plunger heads 50. The plunger heads 42 and 50 are hemispherical in the area contacting the cam portions 67 and 56 to reduce friction therebetween and to accurately movementwise cooperate with the cam portions. The shafts' 46 and 55 upper ends are provided with Allen wrench sockets 57 and 58 and they are also equipped with gage markings 59 and 60 which register relative to the indexes 61 and 62 respectively.

In operation the user inserts a tool 28 between the pad 29 and plate 32 and slightly frictionally engages the tool by turning the screws 33 so that the tool can be adjustably moved; the operator then turns the shafts 46 and 55 as desired to locate the tool 28 relative to a workpiece and the screws 33 are then tightened. Upon a trial cut being made on the workpiece, the dimension of the workpiece is then gaged at the point where the tool is cutting and the difference between the measurements and the desired dimensions is then figured and the tool 28 moved the desired distances either sidewise and/or endwise by turning the shafts 46 and 55 via the Allen wrench sockets 57 and 58 with the markings 59 indicating relative to the indexes 61 and 62 the distance the tool 28 is being moved endwise and/or sidewise by the movement of the frusto-conical cam portions 67 and 56 of the shafts 46 and 55 respectively.

The lead of the threads on the stems 45 and 54, the angle of the frusto-conical portions 67 and 56, and the gage markings 59 and 60 are calibrated so that axial movement of the shafts 46 and 55 relative to the heads 42 and 50 are so co-ordinated that by turning a shaft 46 and 55 the heads 42 and 50 and plungers 40 and 48 are moved a known distance into the cavity 25 to move the tool 28 a known amount as indicated by the gage markings 59 and 60 relative to the indexes 61 and 62.

The inventive tool block holder with these features constitutes a compact, durable, and neat appearing mechanism easily operated to advance a tool sidewise or endwise a known amount as indicated by the gage markings and index and provides the operator with a unique device for advancing the tool an indicated known distance in either the sidewise or endwise direction or both.

Although but a single embodiment of the invention has been shown and described in detail, it is obvious that many changes may be made in the size, shape, detail and arrangement of the various elements of the invention within the scope of the appended claims.

I claim:

1. A tool block for holding tools in a machine having means for accurately moving a tool relative to a workpiece comprising a block having a tool receiving cavity opening through at least one side wall of said block, a tool contacting spacer-filler pad in said block cavity for abutting one side of a tool, at least one screw fixing said pad to said block, a tool contacting spacer-filler plate in said block cavity for abutting the other side of a tool, at least one bolt in said block contacting said plate adapted to urge said plate against a tool to hold a tool between said plate and said pad; said block having an end aperture endwise communicating with said cavity; a spring pressed plunger disposed in said end aperture having one end adapted to contact a tool and a hemispherical head on the other end; said block having an annular chamber transverse to and communicating with said end block aperture at least partially containing said plunger head; said chamber terminating in a threaded bore; a shaft rotatably disposed in said chamber having a tapered portion contacting said head and a threaded portion lying in said threaded bore; said shaft having a projecting end equipped with gage markings, and an index on said block; said bore threads, tapered portion, and markings being co-ordinated so that as said shaft is turned it axially moves in said chamber with said tapered portion camming against said spring pressed head to move said plunger endwise outwardly against a tool to move a tool endwise outwardly of said block and relative to a workpiece a known distance as indicated by said markings on said shaft relative to said index.

2. A tool block for holding tools in a machine having means for accurately moving a tool relative to a workpiece comprising a block having a tool receiving cavity opening through at least one sidewall of said block, a tool contacting spacer-filler pad in said block cavity for abutting one side of a tool, at least one screw fixing said pad to said block, a tool contacting spacer-filler plate in said block cavity for abutting the other side of a tool, at least one bolt in said block contacting said plate adapted to urge said plate against a tool to hold a tool between said plate and said pad; said block having a side aperture sidewise communicating wits said cavity; a spring pressed plunger disposed in said side aperture having one end adapted to contact a tool and a hemispherical head on the other end; said block having an annular chamber transverse to and communicating with said side block aperture at least partially containing said plunger head; said chamber terminating in a threaded bore, a shaft rotatably disposed in said chamber having a tapered portion contacting said head and a threaded portion lying in said threaded bore; said shaft having a projecting end equipped with gage markings, and an index on said block; said bore threads, tapered portion, and markings being co-ordinated so that as said shaft is turned it axially moves in said chamber with said tapered portion camming against said spring pressed head to move said plunger sidewise outwardly against a tool to move a tool sidewise outwardly of said block and relative to a workpiece a known distance as indicated by said markings on said shaft relative to said index.

3. A tool block for holding tools in a machine having means for accurately moving a tool relative to a workpiece comprising a block having a tool receiving cavity opening through at least one sidewall of said block, a tool contacting spacer-filler pad in said block cavity for abutting one side of a tool, at least one screw fixing said pad to said block, a tool contacting spacer-filler plate in said block cavity for abutting the other side of a tool, at least one bolt in said block contacting said plate adapted to urge said plate against a tool to hold a tool between said plate and said pad; said block having an end aperture endwise communicating with said cavity; a spring pressed plunger disposed in said end aperture having one end adapted to contact a tool and a hemispherical head on the other end; said block having an annular chamber transverse to and communicating with said end block aperture at least partially containing said plunger head; said chamber terminating in a threaded bore; a shaft rotatably disposed in said chamber having a tapered portion contacting said head and a threaded portion lying in said threaded bore; said shaft having a projecting end equipped with gage markings, and an index on said block; said bore threads, tapered portion, and markings being co-ordinated so that as said shaft is turned it axially moves in said chamber with said tapered portion camming against said spring pressed head to move said plunger endwise outwardly against a tool to move a tool endwise outwardly of said block and relative to a workpiece a known distance as indicated by said markings on said shaft relative to said index; said block having a side aperture sidewise communicating with said cavity; a second spring pressed plunger disposed in said side aperture having one end adapted to contact a tool and a hemispherical head on the other end; said block having second annular chamber transverse to and communicating with said side block aperture at least partially containing said second plunger head; said second chamber terminating in a second threaded bore; a second shaft rotatably disposed in said second chamber having a tapered portion contacting said head and a threaded portion lying in said threaded bore; said second shaft having a projecting end equipped with gage markings, and a second index on said block; said bore threads, tapered portion, and markings being co-ordinated so that as said second shaft is turned it axially moves in said chamber with said tapered portion camming against said spring pressed head to move said second plunger sidewise outwardly against a tool to move a tool sidewise outwardly of said block and relative to a workpiece a known distance as indicated by said markings on said shaft relative to said index.

4. A tool holder device comprising a block having a cavity for receiving and holding a tool, releasable holding means on said block for gripping and securing a tool in said cavity; said block having transverse plunger apertures leading from said cavity inwardly of said block with at least one aperture located at the inward end of said cavity and at least one aperture located on the side of said cavity; said block having chambers terminating in a threaded bore disposed normal to and communicating with said apertures; plungers lying in said apertures having heads extending into said chambers and tool contacting ends extending into said cavity; shafts disposed in said chambers having threaded ends disposed in said threaded bores, frusto-conical intermediate cam portions contacting said plunger heads, and extending tops having gage markings; indices on said block adjacent said shaft top gage markings; said shaft threads; cam portion, and gage markings being co-ordinated to give a reading relative to how far a said shaft cam portion has moved a said plunger outwardly when a said shaft is rotated to screw inwardly of said block against a tool to move a tool a known distance endwise and/or sidewise as indicated by said indices and gage markings.

5. In a device as set force in claim 4, said plunger heads being spring pressed against said shaft cam portions.

6. A tool holder device comprising a block having a cavity for receiving and holding a tool, releasable holding means on said block for gripping and securing a tool in said cavity; said block having at least one transverse plunger aperture leading from said cavity inwardly of said block; said block having a chamber including a threaded bore disposed normal to and communicating with each said aperture, a plunger lying in said aperture having a head extending into said chamber and a tool contacting end extending into said cavity; a shaft disposed in said chamber having a threaded portion disposed in said threaded bore, a frusto-conical cam portion contacting said plunger head, and a top having gage markings, and an index on said block adjacent said shaft gage markings; said shaft thread, cam portion, and gage markings being coordinated to give a reading relative to how far said shaft cam portion has moved a plunger axially when a shaft is rotated relative to said block abutting a tool to move a tool a known distance as indicated by said index and gage markings.

7. A tool holder device comprising a fixture having an area for receiving and holding a tool, releasable holding means on said fixture for gripping and securing a tool in said area; said fixture having a transverse plunger aperture leading from said area; said fixture having a chamber including a threaded bore disposed normal to and communicating with said aperture, a plunger lying in said aperture having a head extending into said chamber and a tool contacting end extending into said area; a shaft disposed in said chamber having a threaded end disposed in said threaded bore, a frusto-conical cam portion contacting said plunger head, and a top having gage markings, and an index on said block adjacent said shaft gage markings; said shaft thread, cam portion, and gage markings being coordinated to give a reading relative to how far said shaft cam portion has moved said plunger and an abutting tool when said shaft is rotated relative to said fixture to move a tool a known distance as indicated by said index and gage markings.

References Cited in the file of this patent

UNITED STATES PATENTS

| | | |
|---|---|---|
| 2,382,911 | Pringle | Aug. 14, 1945 |
| 2,475,049 | Premo | July 5, 1949 |
| 2,669,149 | Watson | Feb. 16, 1954 |

FOREIGN PATENTS

| | | |
|---|---|---|
| W12,684 | Germany | Mar. 15, 1956 |